United States Patent
Yousaf et al.

(10) Patent No.: US 10,581,983 B2
(45) Date of Patent: Mar. 3, 2020

(54) METHOD AND SYSTEM FOR MANAGEMENT OF MOBILE NETWORK SLICES OVER A FEDERATED INFRASTRUCTURE

(71) Applicant: NEC Laboratories Europe GmbH, Heidelberg (DE)

(72) Inventors: Faqir Zarrar Yousaf, Leimen (DE); Xi Li, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/029,699

(22) Filed: Jul. 9, 2018

(65) Prior Publication Data
US 2020/0014764 A1 Jan. 9, 2020

(51) Int. Cl.
*H04W 36/14* (2009.01)
*H04L 29/08* (2006.01)
*H04W 48/16* (2009.01)

(52) U.S. Cl.
CPC ............. *H04L 67/16* (2013.01); *H04W 36/14* (2013.01); *H04W 48/16* (2013.01)

(58) Field of Classification Search
CPC ........ H04L 67/16; H04W 48/16; H04W 36/14
See application file for complete search history.

(56) References Cited

U.S. PATENT DOCUMENTS

| 2016/0127333 | A1* | 5/2016 | Sood ........................ H04L 63/06 380/44 |
| 2016/0299960 | A1  | 10/2016 | Chene et al. |
| 2017/0188054 | A1* | 6/2017 | Ma ........................ H04L 67/2814 |
| 2017/0222889 | A1  | 8/2017 | Zong et al. |

FOREIGN PATENT DOCUMENTS

WO  WO 2018202814 A1  11/2018

OTHER PUBLICATIONS

ETSI GS NFV-MAN 001 V1.1.1 (Dec. 2014), "Network Functions Virtualisation (NFV); Management and Orchestration", Dec. 2014, pp. 1-184.

(Continued)

*Primary Examiner* — Chuong A Ngo
(74) *Attorney, Agent, or Firm* — Leydig, Voit & Mayer, Ltd.

(57) ABSTRACT

A method for operating a u-MANO inside a user domain that ensures deployment and service integrity of end-to-end network services in collaboration with a p-MANO includes receiving a request for a network service instance; and initiating a discovery operation to discover the p-MANO if the request's scope is determined to extend beyond the user domain. The discovery operation includes: determining an identity and/or an address of the p-MANO; sending a solicitation message to the p-MANO to discover its reachability and availability; sending a service request specifying network service requirements to the p-MANO in response to receiving a solicitation response from the p-MANO; and receiving a service acceptance from the p-MANO. The method further includes instantiating and deploying the network service instance that is at least partially within the user domain and partially outside the user domain.

17 Claims, 7 Drawing Sheets

(56) References Cited

OTHER PUBLICATIONS

ETSI GR NFV-IFA 022 V3.1.1 (Apr. 2018), „Network Functions Virtualisation (NFV) Release 3; Management and Orchestration; Report on Management and Connectivity for Multi-Site Services, Apr. 2018, pp. 1-128.
ETSI GR NFV-IFA 028 V3.1.1 (Jan. 2018), Network Functions Virtualisation (NFV) Release 3; Management and Orchestration; Report on architecture options to support multiple administrative domains, Jan. 2018, pp. 1-59.

\* cited by examiner

METHOD AND SYSTEM FOR MANAGEMENT OF MOBILE NETWORK SLICES OVER A FEDERATED INFRASTRUCTURE

FIELD

The present invention relates to a method and system for management of mobile network slices over a federated infrastructure.

BACKGROUND

Network Functions Virtualization (NFV) adds new capabilities to communications networks and requires a new set of management and orchestration functions to be added to the current model of operations, administration, maintenance and provisioning. In legacy networks, Network Function (NF) implementations are often tightly coupled with the infrastructure they run on. NFV decouples software implementations of NFs from the computation, storage, and networking resources they use. The virtualization insulates the NFs from those resources through a virtualization layer.

The decoupling exposes a new set of entities, the Virtualized Network Functions (VNFs), and a new set of relationships between them and the NFV Infrastructure (NFVI). VNFs can be chained with other VNFs and/or Physical Network Functions (PNFs) to realize a Network Service (NS).

An NFV management and orchestrator (MANO) deployment is usually in the core/edge network functions virtualization infrastructure-point-of-presence (NFVI-PoP) (e.g., datacenters or telecommunication networks) as it is designed to manage and orchestrate the network services (NS) and their associated resources, which are within the confines of the respective datacenter (DC). For a further discussion of NFV-MANOs see "Network Function Virtualization, Management and Orchestration," ETSI GS NFV-MAN 001 v1.1.1 (ETSI December 2014), the entire contents of which are hereby incorporated by reference herein. Moreover, use cases and requirements of NFV-MANOs in multi-site environments are discussed in "Report on Management and Connectivity for Multi-Site Services," ETSI GR NFV-IFA 022 v0.8.2 (ETSI February 2018) and "Report on architecture options to support multiple administrative domains," ETSI GR NFV-IFA 028 v3.1.1 (ETSI January 2018)—the entire contents of each are hereby incorporated by reference herein—that enable the NFV-MANO system to manage the deployment, connectivity and resource orchestration of the NS across multiple NFVI-PoPs that are federated over a wide area network (WAN) infrastructure.

With respect to a distributed NFV-MANO system, one approach is that each tenant has its own MANO stack (referred to as tenant-MANO (t-MANO)) that is under the control of a central MANO in order to provide management autonomy to the tenants (i.e., NS and/or resource owners). See e.g., International Patent Application No. PCT/EP2018/061426 (the entire contents of which are hereby incorporated by reference herein).

In all the above NFV-MANO approaches, the underlying assumption is that the NFV-MANO system, whether centralized or distributed, is deployed at fixed locations, referred herein as fixed NFVI-PoPs (fNFVI-PoPs), which may be at the core DC or the edge DC of the overall network architecture. The end-users (or end-entities) connect to the respective MANO system at the edge/core DCs for service delivery.

SUMMARY

In an embodiment, the present invention provides a computer-based method for operating a manager and orchestrator (u-MANO) inside a user domain that ensures deployment and service integrity of end-to-end network services in collaboration with at least one provider manager and orchestrator (p-MANO). The method includes: receiving a request for a network service instance; determining whether a scope of the request extends beyond the user domain; and initiating a discovery operation to discover the at least one p-MANO in a case where the scope extends beyond the user domain. The discovery operation includes: determining an identity and/or an address of the at least one p-MANO; sending a solicitation message to the at least one p-MANO to discover a reachability and an availability of the at least one p-MANO; sending a service request specifying network service requirements to the at least one p-MANO in response to receiving a solicitation response from the at least one p-MANO; and receiving a service acceptance from the at least one p-MANO. The method further includes instantiating and deploying the network service instance that is at least partially within the user domain and partially outside the user domain.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
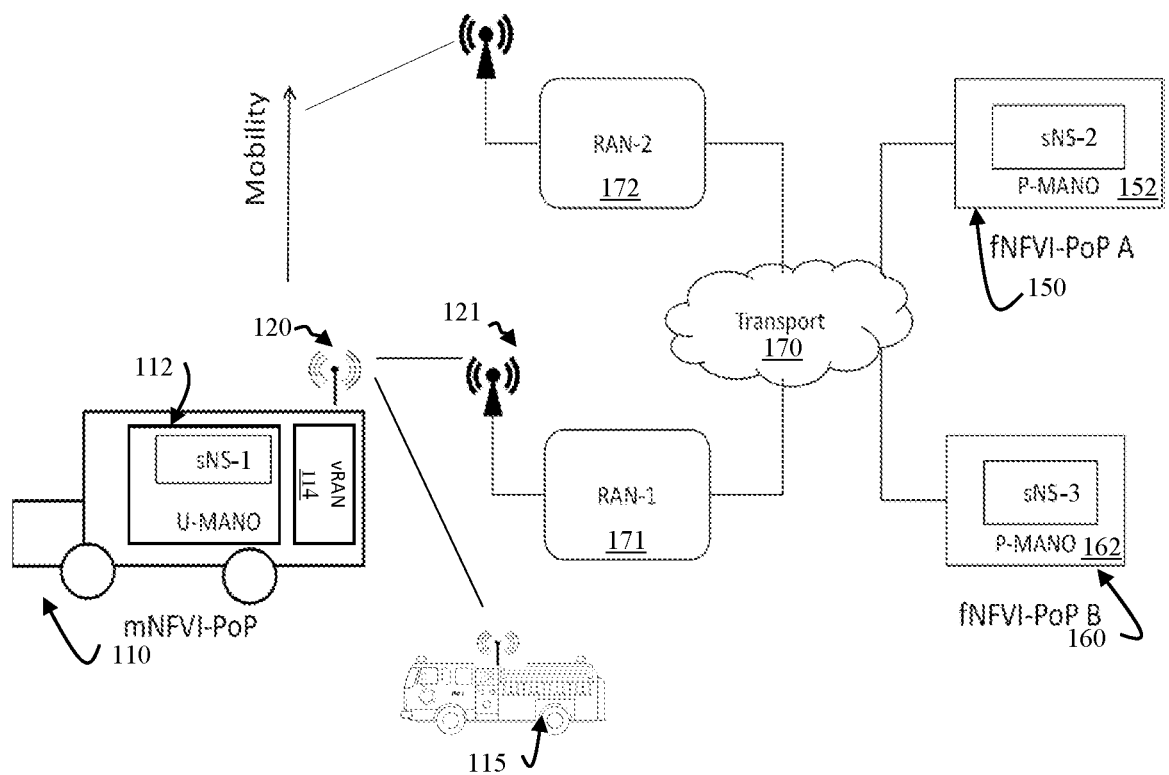
FIG. 1 illustrates an overview of an example problem space.

Management and orchestration of end-to-end network services when the MANO system is mobile and inside the user domain (referred to herein as a u-MANO) raises several challenges and issues in the computer arts that must be addressed in order to manage the end-to-end network services in collaboration with the provider MANO (p-MANO). Embodiments of the present invention provide an improved computer based method and system that includes a u-MANO that overcomes such challenges and issues.

In view of some compelling and emerging use cases, the inventors have recognized that the existing state-of-art does not consider use cases where a full or partial deployment of the NFV-MANO stack is required to be deployed at (or within) the user domain. For example, there are situations where an NFV infrastructure (NFVI) is expected to be available within the user-domain itself, such as inside the user-entity (UE) and the end-user transport entity—e.g., a mobile entity such as a mobile Base Station (mobile-BS); Emergency and Rescue vehicles (fire engines, ambulances, police vans, etc.); trains; buses; Outside Broadcast (OB) Vans for live TV broadcast services; etc. NFVIs that are within the user domain are referred to herein as mobile NFVI-PoPs (mNFVI-PoPs). Such mNFVI-PoPs should have their own NFV-MANO system—which is referred to as a user MANO (u-MANO)—in order to instantiate, deploy, manage and orchestrate NS instances within their respective local domain.

Besides instantiating and deploying NS instance(s) within the local domain of the mNFVI-PoP, the u-MANO may also connect the local NS instance(s) with NS instance(s) that are located within the edge/core NFVI-PoP(s) (fNFVI-PoPs) in order to extend the functional/operational boundaries of the local NS instance(s). In such a situation, the end-to-end NS is composed of multiple sub-NS segments—which are referred to as sub-Network Service (sNS) instances—where the different segments are managed by different MANO systems. That is, the sNS segment within the user-entity is managed by the u-MANO while the sNS segment(s) within the edge/core NFVI-PoP is managed by one or more provider MANOs (p-MANO(s)). In such a scenario, the inventors have recognized that it is imperative to ensure seamless coordination between the u-MANO and the p-MANO system(s) to ensure the end-to-end integrity and service continuity of the NS(s). However, the problem of coordination between the two MANO systems becomes challenging when the mNFVI-PoP changes it location due to mobility, resulting in dynamic switching (handover) among multiple p-MANO systems.

It is in perspective with the above problem, that embodiments of the present invention provide a method and system to ensure a seamless coordination between the u-MANO and p-MANO to ensure integrity and service continuity provided by the end-to-end NS instances deployed over the mNFVI-PoP and fNFVI-PoP. Embodiments of the present invention provide a substantial improvement over current systems because (for example) those systems do not ensure seamless coordination between the u-MANO and the p-MANO system, unlike embodiments.

FIG. 1 illustrates an overview of an example problem space. Embodiments of the invention will be explained with reference to this example; however, it should be recognized that the embodiments are not limited to this example problem space.

FIG. 1 illustrates a 5G use case of a rescue and emergency situation. A mobile-BS 110, equipped with computer and networking resources, serves as a mNFVI-PoP. It may be required to set up an ad-hoc network and communication services at the accident/disaster site 115 in order to coordinate other rescue units and also connect them to their respective headquarter (HQ) or service providers (e.g., to OTT service providers). For this purpose, a u-MANO 112 inside the mobile-BS (mNFVI-PoP) 110 will instantiate and deploy a virtualized radio access network (vRAN) 114 and its associated NS over the mNFVI-PoP. This ad-hoc vRAN 114 is then linked (or stitched) to the mobile core network (e.g., vEPC) deployed in the edge/core NFVI-PoP(s) in order to enable it to connect to the HQ and other third party services. As shown in FIG. 1, the mobile-BS 110 uses mobile interface 120 (e.g., a radio, such as a GSM radio) to communicate with a provider interface 121 (e.g., a radio, such as a GSM radio) to connect to a first provider's radio access network (RAN-1) 171. Via the RAN-1 171 the u-MANO 112 may communicate and coordinate with the p-MANO 152 of fNFVI-PoP-A 150, this communication may involve a transport network 170. This forms an end-to-end NS instance that is composed of two sNS(s), where one sNS segment is managed by the u-MANO 112—sNS-1—and the other by the p-MANO 152—sNS-2.

In embodiments, there may be, for example, multiple fNFVI-PoPs, such as shown in FIG. 1 which also includes fNFVI-PoP-B 160 managed by the p-MANO 162. Here the NS instance may include three sNSs: sNS-1 managed by the u-MANO 112; sNS-2 managed by the p-MANO 152; and sNS-3 managed by the p-MANO 162.

Figure 2:
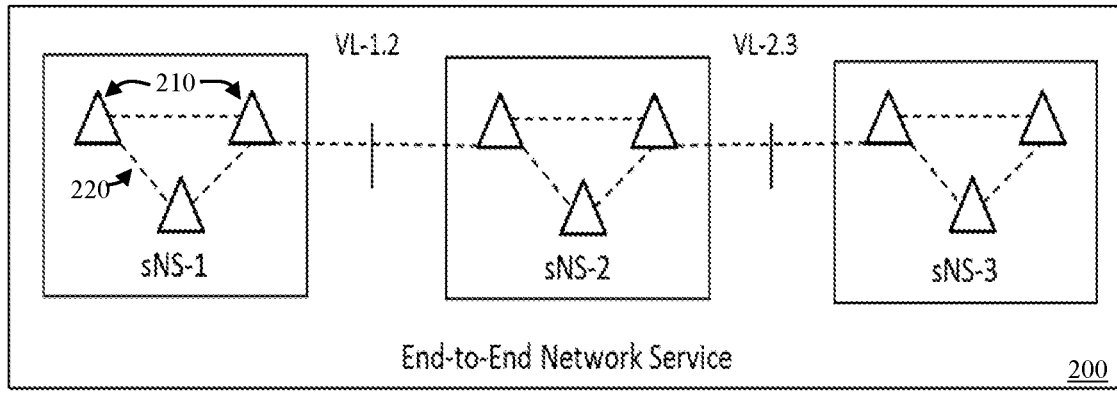
FIG. 2 illustrates a conceptual overview of an end-to-end network service (NS) according to an embodiment.

FIG. 2 illustrates a conceptual overview of an end-to-end Network Service (NS). The end-to-end NS 200 illustrated in FIG. 2 includes three sNS segments (sNS-1, sNS-2, and sNS-3). Here, each sNS segment is linked to each other via Virtual Links (VL). Specifically, a first sNS segment sNS-1 is linked to a second sNS segment sNS-2 via a first virtual link VL-1.2, and the second sNS segment sNS-2 is linked to a third sNS segment sNS-3 via a second virtual linkVL-2.3. The virtualized network functions (i.e., VNFs and/or VNF Components (VNFCs)) 210 within each sNS segment are also linked to each other over VLs 220.

With reference to our use case scenario in FIG. 1, sNS-1 is deployed within the mNFVI-PoP domain and thus managed by the u-MANO 112 inside the mobile-BS 110. Whereas, the other sNS segments (sNS-2 and sNS-3) are deployed in the core/edge fNFVI-PoP(s) (150 and 160) and thus managed by the p-MANO (152 and 162) owned by the domain provider(s).

A problem of coordination between the two MANO systems becomes challenging when the mobile-BS 110 changes it location due to mobility, resulting in dynamic switching (handover) among multiple p-MANO systems. As shown in FIG. 1, when mobile-BS 100 moves, it could handover to the p-MANO 152 of fNFVI-Pop-A 150. This handoff can include switching provider interfaces 121 and between the first provider radio access network (RAN-1) 171 and the second provider radio access network (RAN-2) 172. According to embodiments of the invention, seamless coordination between the u-MANO and the p-MANO systems will occur.

Figure 3:
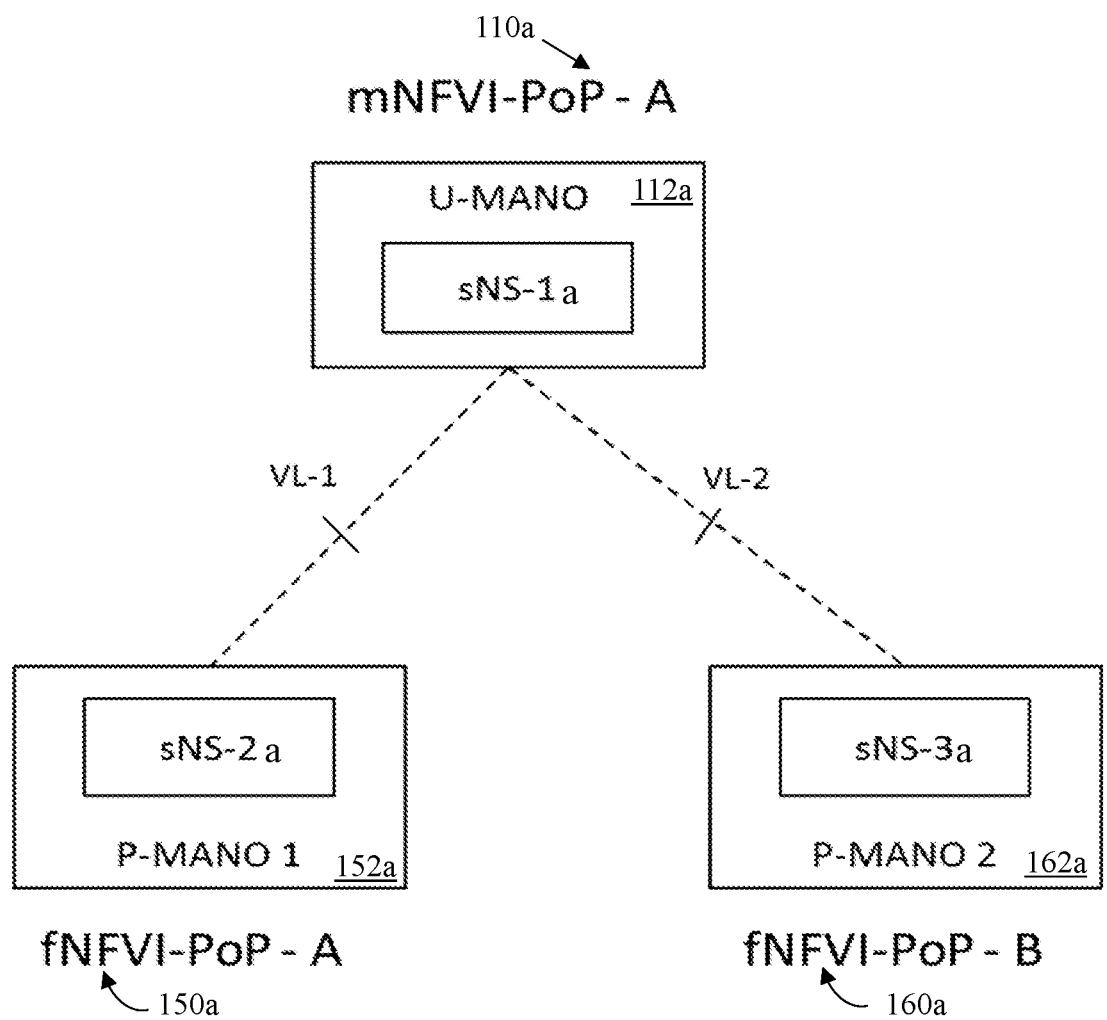
FIG. 3 illustrates a service extension of a sub-Network Service (sNS) segment inside a mobile user domain with sNS segments of multiple provider domains according to an embodiment.

FIG. 3 illustrates service extension of a sNS segment inside the mobile user domain with sNS segments of multiple provider domains. This embodiment includes resource/service aggregation. Here, the u-MANO 112a of the mobile BS 110a has to coordinate with two different p-MANO systems belonging to different fNFVI-PoPs.

In FIG. 3, the mobile-BS 110a aggregates resource and/or services offered by different providers, which is achieved by the u-MANO 112a connecting (or stitching) the local sNS segment sNS-la to two or more sNS segments in different fNFVI-PoP domains. For example, the u-MANO 112a connects the local sNS segment sNS-la to a second sNS segment sNS-2a via a first virtual link VL-1 and connects the local sNS segment sNS-la to a third sNS segment sNS-3a via a second virtual link VL-2. Here, the second sNS segment sNS-2 is in a first fNFVI-PoP domain fNFVI-PoP-A and the third sNS segment sNS-3 is in a second fNFVI-PoP domain fNFVI-PoP-B. In embodiments, a network slice can map to the NS or any of its sub segments.

The inventors have recognized that a technical challenge posed in a system with a mobile u-MANO is to ensure the service integrity of the end-to-end NS instance(s) and to ensure seamless connectivity especially in the event of the mNFVI-PoP mobility. Embodiments of the present invention address this technical challenge by providing an improved computer based system that, during the mobility scenario, operates the u-MANO to discover the p-MANO, to identify and register its new location, transparently and seamlessly reconnect and reconfigure the local sNS segment with the sNS segment(s) that are within the fixed edge/core NFV infrastructure (i.e., fNFVI-PoPs) while ensuring the continuity of services at the same quality-of-service (QoS) level. To ensure QoS compliance, the u-MANO of embodiments can also negotiate with a different provider fNFVI-PoP(s) to provide the same NS services in case the previous fNFVI-PoP(s) is(are) not able to provide the expected QoS, either due to increased latency factors or if they are no longer accessible due to the mobility of the mNFVI-PoP.

Figure 4:
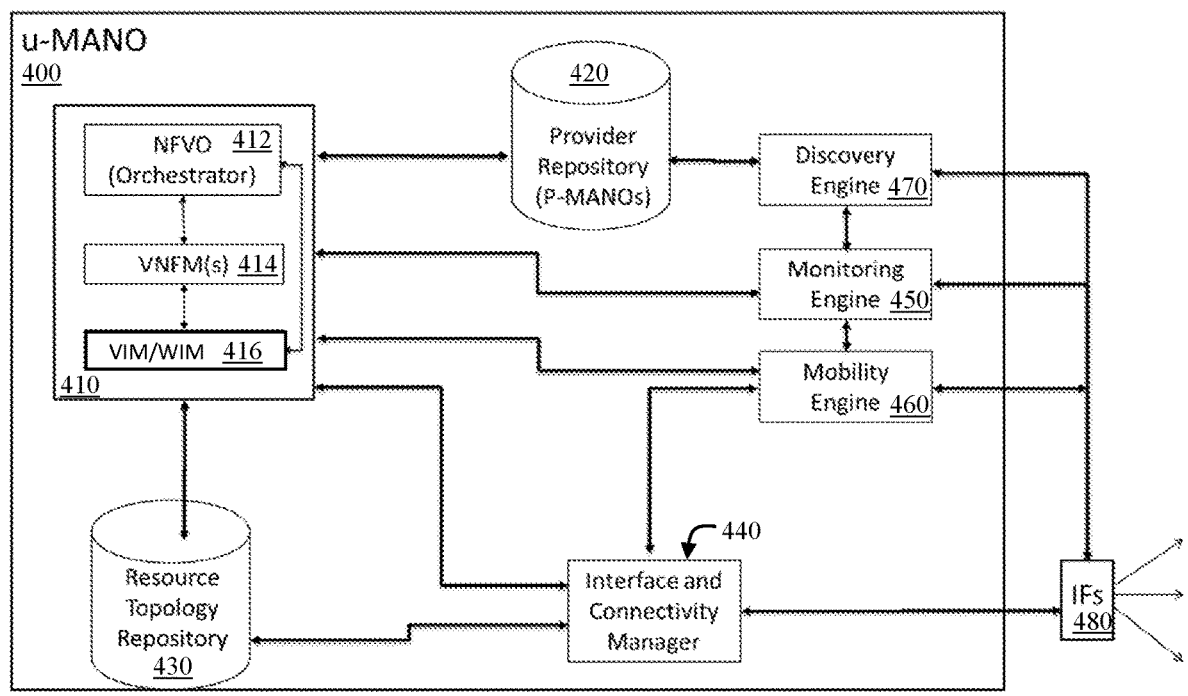
FIG. 4 illustrates a u-MANO architecture according to an embodiment.

FIG. 4 illustrates u-MANO architecture according to an embodiment.

In FIG. 4, a u-MANO 400 includes a MANO system 410 (for example, an ETSI NFV MANO stack). The MANO system 410 includes an NFV orchestrator (NFVO) 412, one or multiple VNF Managers (VNFM) 414 for the Lifecycle Management (LCM) of VNFs, and one or more Virtualized Infrastructure Manager (VIM) 416 to control the different networking and computing resources in the local mNFVI-PoP domain. The VIM within the u-MANO may also include WAN Infrastructure Manager (WIM) functionality.

The u-MANO 400 also includes a provider repository 420, which contains a list of provider fNFVI-PoPs that the user has a subscription to. The provider repository 420 stores provider details including, but not limited to, the user's contact and subscription information, the catalogues of resources/services types that the respective fNFVI-PoP offers, the provider's identity/contact information, and the functional capabilities of the respective p-MANO systems.

A resource topology repository 430 is also included in the u-MANO 400. The resource topology repository 430 stores the resource and topology details from the user local domain as well as from the provider domains provided by p-MANOs.

The u-MANO 400 has an interface and connectivity manager 440 responsible for configuring and managing the interfaces within the user entity.

A monitoring engine 450 is also provided in the u-MANO 400 to collect monitoring data from the local network, as well as receiving the network and service monitoring reports from different p-MANOs over the user interfaces (Ifs) 480.

The u-MANO 400 includes a mobility engine 460. The mobility engine 460 performs mobility related actions (such as handling standard handover process and/or handover process between the p-MANO systems). The handover may be network-based or user-based, or even a hybrid. In the hybrid case, the u-MANO 400 may override the handover decision made by the standard process (e.g., 3GPP handover decision) in case it does not fulfill the performance requirements, and the user may choose a different BS (or even provider network within range) to (re)connect to the sNS segments of selected p-MANO domain(s).

A discovery engine 470 is included in the u-MANO 400 to discover the p-MANO(s) that are reachable from its existing location. These p-MANO(s) include not only the ones already stored in the provider repository 420 that the user has subscribed to, but also the ones the user has not subscribed to and may negotiate a service contract including SLA negotiations upon demand. During the discovery process, the u-MANO 400 will try to collect the necessary information of the provider networks on their offered resources/services types, availability and capabilities of their p-MANOs, through the interface to the p-MANO.

Figure 5:
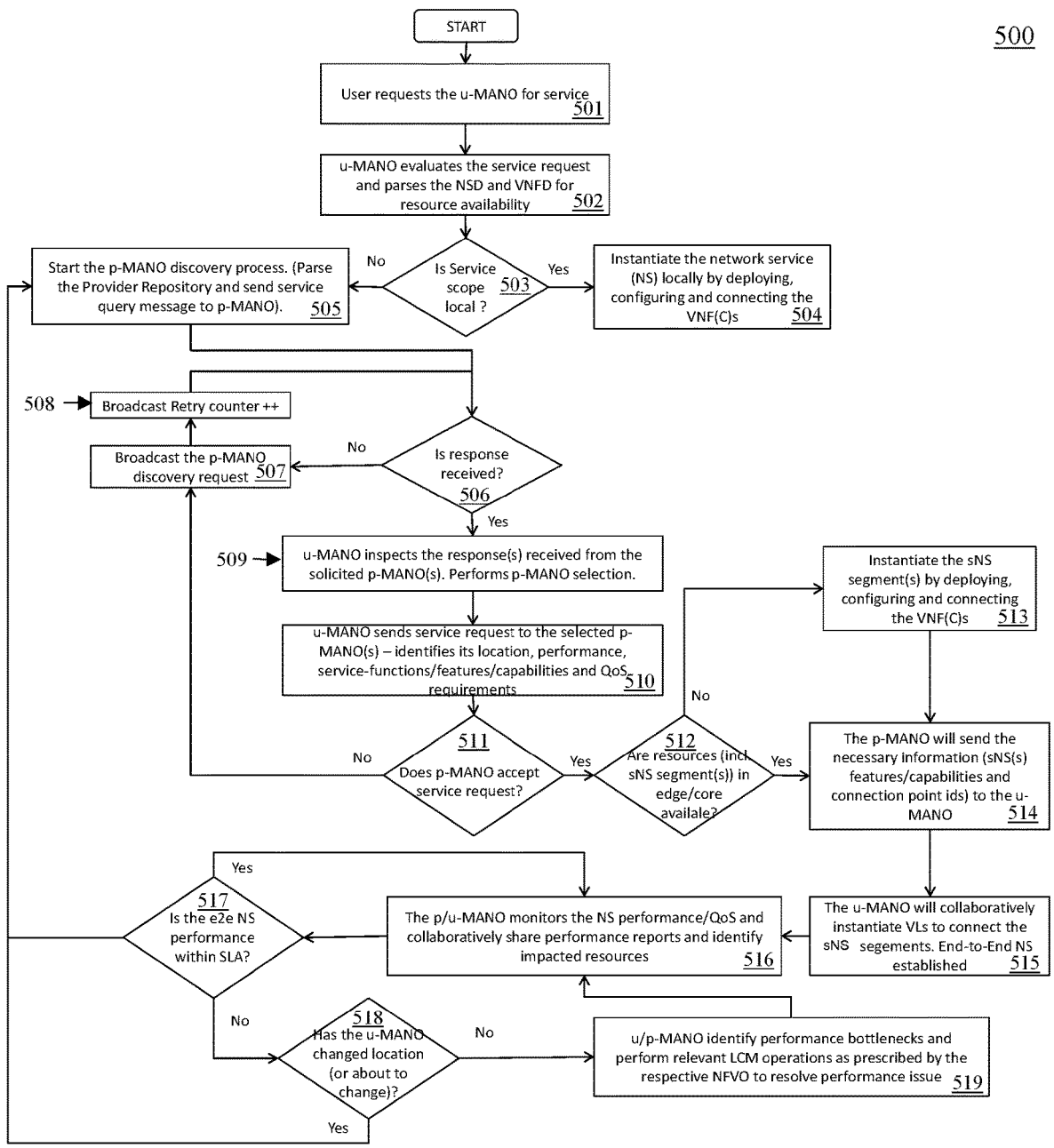
FIG. 5 illustrates a method for managing mobile network slices according to an embodiment.

FIG. 5 provides an illustration of a method 500 according to an embodiment of the invention.

At the start of the method 500, a user initiates a service request (Operation 501) to a u-MANO (e.g., u-MANO 112). The user can be the administrator of the mNFVI-PoP (for example, the mobile-BS 110) who wants to set up a specific service. The service request can identify the service requirements (in terms of functional/operational/resource requirements) that are indicated to the NFVO of the u-MANO instance. The service request can include a network service descriptor (NSD) and a virtualized network function descriptor (VNFD).

The u-MANO that receives the service request evaluates the service request, and parses the NSD and the VNFD for resource availability (Operation 502). The u-MANO determines whether or not the service scope is local (Operation 503).

If the service scope is local, then the u-MANO will resolve the user request to instantiate and deploy the NS (e.g., as per the standard process specified by the ETSI NFV) (Operation 504). The u-MANO will parse the NSD/VNFD files (for example to identify the relevant VNFs and VNFFG); instantiate and deploy the VNFs; configure them and interconnect them via VLs to set up the active NS instance within its local domain (i.e. within the mNFVI-PoP).

In case the u-MANO identifies that the scope of the requested service extends beyond the mNFVI-PoP—for example, either in terms of resources and/or functional components (e.g., VNFs), the u-MANO will then initiate the p-MANO discovery process, which includes parsing a provider repository (e.g., the parser repository 420) and sending a service query message to a p-MANO (Operation 505). In an embodiment, the user entity has subscriptions with multiple mobile network service providers, and is already connected to a mobile network infrastructure for data services. The u-MANO will send a service/resource discovery request over the u-MANO and p-MANO interfaces to the p-MANO instances that it is subscribed to. The u-MANO can determine its subscriptions by parsing its provider repository. The p-MANO(s) may be provided by the same mobile network service provider or by another NFVI provider with which the u-MANO has a subscription contract (or trust relationship) with. During the discovery process, the u-MANO may update its provider repository with newly discovered p-MANO(s), or update information of the existing records of the p-MANO(s) with latest resource/service status (pull mode) in order to expedite the NS management/orchestration decisions made by the u-MANO. The p-MANO can also (e.g., alternatively or additionally) periodically update the u-MANOs provider repository with its latest resource/service status (push mode).

Over the interface to the p-MANO, the u-MANO sends the service/resource request to the discovered p-MANO(s) indicating the requested services (service types, descriptor of the sNS segment to be provided by the p-MANO) and containing performance/reliability/QoS(E) requirements (such as latency, bandwidth, error rate, etc.). It may also include the details of the NS that is local to the mNFVI-PoP, including the current location IDs (e.g., IP address(es)) and the attached mobile network provider. The p-MANO(s) will then send a reply indicating whether it accepts/rejects the NS request.

After the u-MANO sends the service/resource request, it will wait for a response (Operation 506). After some waiting period and in the case no response is received, the u-MANO can resend the request and/or send a broadcast out requesting a p-MANO (Operation 507). When a broadcast is sent, the u-MANO will increment a broadcast retry counter (Operation 508). If the broadcast retry counter meets and/or exceeds a broadcast threshold, the u-MANO may register an error and/or stop the method 500.

In the case where the u-MANO receives one or more responses from the p-MANOs, the u-MANO inspects the response(s) received from the solicited p-MANO(s), and will select a p-MANO that best serves its requirements (Operation 509).

In the case where the u-MANO receives acceptances from multiple NFVI-PoPs, it will then select the one or more NFVI-PoPs that is (are) appropriate to its requirements. For instance, not all p-MANOs may be able to fulfil all service requirements. In this case the u-MANO will select p-MANOs that is able to fulfil its (extended) service requirements and aggregate the provided resources (including sNS segments) into a single end-to-end NS. In case the u-MANO does not get any response it will then broadcast the p-MANO solicitation request.

The u-MANO will then send a formal service extension request (including the details of the connection point of the local sNS and IP address(es), its location, performance, service-functions/features/capabilities and QoS requirements, etc.) to the selected p-MANO (Operation 510).

After sending the formal service extension request, the u-MANO will wait for a response (Operation 511). In the case where no response is received (e.g., after a pre-defined wait time), the u-MANO will start its search over, e.g., by resending or broadcasting the p-MANO discovery request (Operation 507).

However, in the case where the p-MANO does accept the u-MANO's formal service request (and informs the u-MANO of such acceptance), the p-MANO will determine whether there are sufficient resources (including sNS segment(s)) available in the edge/core (Operation 512).

In the case where there are not sufficient resources, the p-MANO will instantiate the sNS segment(s), e.g., by deploying, configuring, and connecting the VNF(C)s (Operation 513). The p-MANO(s) instantiates and deploys the sNS(s) in its edge/core NFVI domains and then connects to the one at the user side of the local mNFVI-PoP domain.

When sufficient resources are available, the p-MANO will send the necessary information (e.g., sNS(s) features/capabilities, and connection point Ids) to the u-MANO (Operation 514). Here, either the selected fNFVI-PoP(s) already have active NS instance(s) with which the mNFVI-PoP local NS wants to connect with in order to create an end-to-end NS, or sufficient resources were instantiated in a prior operation.

The service provisioning process will start soon after the different sNS segments are stitched together to form an end-to-end NS (Operation 515). Here, the u-MANO will collaboratively instantiate VLs to connect the sNS segments.

During the lifetime of the end-to-end NS, the u-MANO will periodically monitor the NS service performance and resource consumption (Operations 516, 517). Here, the u-MANO and/or the p-MANO monitors the NS performance and quality of service. The u-MANO and/or p-MANO may collaboratively share performance reports and identify impacted resources.

During the service run time, whenever detecting service degradation, the u-MANO may trigger orchestration actions on its local sNS segment(s) or signal the p-MANO instance(s) to trigger appropriate orchestration action(s) on their respective sNS segment(s) in order to ensure continued service integrity. Both the u-MANO and the p-MANO should coordinate the orchestration action(s) to ensure optimum decisions. Orchestration decisions may include (re)selection of one or multiple p-MANO(s), decomposition or splitting end-to-end NS into multiple constituent sNSs each deployed by the u-MANO or one of the p-MANO(s) together with their resources requirements, the coordination among constituent sNSs e.g. for load balancing or aggregation, as well as to ensure the LCM of composite end-to-end NS.

Orchestration action(s) are triggered when the end-to-end NS performance is outside the SLA (Operation 518).

For example, orchestration may be triggered when the u-MANO and/or p-MANO detect service degradation through real time monitoring (Operations 516, 517). In this case they will collaboratively identify the service impacting resources (e.g., VNF, VL, vCPU, memory, vNIC etc.) and then take appropriate Lifecycle management (LCM) actions (e.g., scale in/out/up/down, migrate, update, etc.) or re-optimize the resource allocation (Operation 519). Here, the system may first detect whether the u-MANO changed location (or is about to change location) indicating a different triggering event (Operation 518), before attempting to identify performance bottlenecks and performing relevant LCM operations as prescribed by the respective NFVO to resolve the performance issues.

If it is determined that the mNFVI-PoP (for example, mobile-BS 110) moves from one RAN to another i.e., changes its location, and hence Point of Connection (Operation 518), the system assumes that the handover of the mobile entity will take place as per the standard procedure (e.g., 3GPP based handover).

However, in case the performance/reliability/QoS parameters are not complying with the expected service performance benchmark then the u-MANO/p-MANO can handle either the intra-admin domain case or the inter-admin domain case.

In the intra-admin domain case, after handing over to a new point of contact (e.g. a new eNB and/or a new sGW), the u-MANO will inform the p-MANO of its new location and/or of the degraded service quality. Then the p-MANO will take relevant steps to ensure that the VL between the sNS local at the mobile entity is reconnected to the sNS segment(s) at the edge/core fNFVI-PoPs controlled by the p-MANO(s) and ensure QoS. In case the existing fNFVI-PoP is not able to fulfill the QoS requirements due to the u-MANO new location, in that case the p-MANO selects a new fNFVI-PoP that is within the same administrative domain of the current fNFVI-PoP. In such a case the p-MANO will migrate the existing sNS segment(s) to the newly selected fNFVI-PoP and instruct the u-MANO to establish connectivity with it, by providing all the location and connection details necessary for the u-MANO to establish connectivity of its local sNS segment with the edge/core sNS segment(s) that are now in a new fNFVI-PoP.

This is the case when multiple fNFVI-PoPs are managed by a centralized p-MANO. In case of a distributed p-MANO architecture (i.e., each fNFVI-PoP has its own local p-MANO), the p-MANO will select the next p-MANO/fNFVI-POP and take relevant steps to migrate the required sNS segment(s) (including the states) to the new fNFVI-PoP and bring them under the management of the new p-MANO. The p-MANO will inform the u-MANO of the newly selected p-MANO/fNFVI-POP and the connection points of the migrated sNS segment(s). The u-MANO will then establish correspondence with the new fNFVI-PoP/p-MANO and reconnect its local sNS segment with the migrated sNS segment(s) managed by the new p-MANO.

In the inter-admin domain case, where the p-MANO is not able to find a suitable fNFVI-PoP/p-MANO instance or when the p-MANO is not reachable anymore, the u-MANO will start the discovery process (Operation 505) of new edge/core NFVI-PoP(s) that may be in other reachable administrative domains that can meet its requirements (e.g., service resource and/or functional and/or operational requirements). In case all NFVI-PoPs listed in the provider Repository are not available (or not reachable or not able to provide the requested services), then the u-MANO can have interfaces that allow it to dynamically negotiate a service contract (including SLA negotiations) with a new provider that is reachable from its new point of connection.

Once (re)established the u-MANO will enter the monitoring state (Operation 516).

A person of ordinary skill should recognize that embodiments of the present invention do not preclude collaboration between multiple u-MANOs in different mNFVI-PoP domains to create end-to-end NS.

In embodiments, the p-MANO (e.g., p-MANO 152 of fNFVI-PoP-A) has architectural provisions to support the functional interfaces with the u-MANO (e.g., u-MANO 112 of mobile BS 110). For example, the p-MANO can maintain the identities, location, security certificates, SLA conditions/bounds, configuration information, etc. for the various u-MANOs that are subscribed to the p-MANO. Moreover, the p-MANO can also maintain service states for the NS instances that are active between the p-MANO and u-MANO.

With reference to the ETSI NFV-MANO framework, these architectural provisions can be implemented by improving/modifying existing repositories, or improving/modifying the entire framework to include (maintain) a separate repository.

Figure 6:
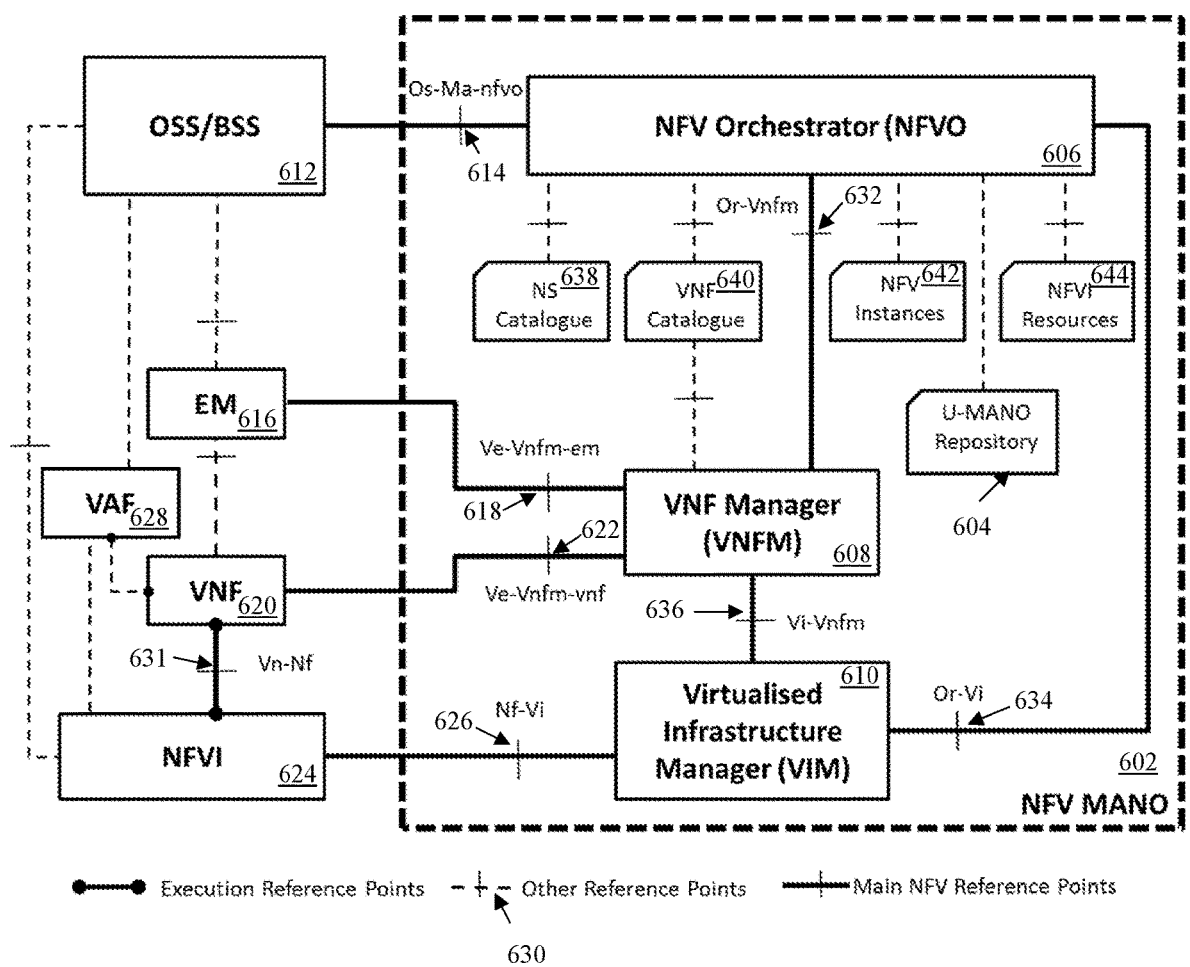
FIG. 6 illustrates an NFV-MANO architectural framework with the additional u-MANO repository according to an embodiment.

An example embodiment is depicted in FIG. 6 and shows an NFV-MANO architectural framework 600, where an NFV-MANO 602 includes a u-MANO repository 604. The NFV-MANO architectural framework 600 can include many architectural provisions of an ETSI NFV-MANO stack, but as improved to include the functionality described herein.

In FIG. 6, the NFV-MANO 602 includes an NFV Orchestrator (NFVO) 606, a VNF Manager (VNFM) 608, and a virtualized infrastructure manager (VIM) 610—which are functional blocks of the NFV-MANO 602.

These NFV-MANO functional blocks (606, 608, and 610) interact with other functional blocks via NFV-MANO reference points. For example, the NFVO 606 can interact with an operations support system/business support system (OSS/BSS) 612 via the Os-Ma-nfvo reference point 614. The VNFM 608 can interact with the element manager (EM) 616 via the Ve-Vnfm-em reference point 618 and with the VNF 620 via the Ve-VnFM-vnf reference point 622. The VIM 610 can also interact with the NFVI 624 via the Nf-Vi reference point 626. These other functional blocks outside the NFV-MANO 602, as well as a Virtualized Application Function (VAF) 628, also interact with each other via other reference points 630. See generally, International Patent Publication No. WO 2017088905 A1 (describing VAFs; the entire contents of which are hereby incorporated by reference herein). Additionally, VNF 620 and NFVI 624 can interact via an execution reference point Vn-Nf 631.

The NFV-MANO functional blocks (603, 606 and 608) of the NFV-MANO 602 also interact with each other via reference points. For example, the NFVO 606 interacts with the VNFM 608 and the VIM 610 respectively via the Or-Vnfm reference point 632 and the Or-Vi reference point 634. Also, the VNFM 608 interacts with the VIM 610 via the Vi-Vnfm reference point 636.

The NFVO 606 and the VNFM 608 also interact with data repositories via other reference points 620. For example, the NFVO 606 interacts with the NS catalogue 638, the VNF catalogue 640, the NFV instances 642, the NFVI resources 644, and the u-MANO repository 604 (which is included in furtherance of aspects of the present invention). The VNFM manager 608 may also interact with the VNF catalogue 640. The NFV-MANO architecture 600 does not preclude the presence of a WAN Infrastructure Manager (WIM) functional block for managing connectivity services over the WAN infrastructure. Accordingly, in an embodiment, a WIM functional block is included.

In embodiments, the p-MANO uses the NFV MANO architectural framework 600, which as described above can operate according to the ETSI standard as improved with architectural provisions to support functional interfaces with the u-MANOs of embodiments. For example, the p-MANO can maintain the identities, location, security certificates, SLA conditions/bounds, configuration information, etc. for the various u-MANOs that are subscribed to the p-MANO in the u-MANO repository 604.

Moreover, the p-MANO can also maintain service states for the NS instances that are active between the p-MANO and u-MANO. In embodiments, the active state of the end-to-end NS instance(s) that are jointly managed between the u-MANO and p-MANO(s) can be maintained inside the NFV instances repository 642 with the provision to map the sNS segments of the jointly-managed NS to the corresponding p-MANO and u-MANO instance(s) id(s).

In addition, the p-MANO will provide the corresponding APIs for the interface to the u-MANOs. The u-MANO will also expose the relevant APIs for the interfaces to the p-MANO.

Embodiments of the present invention provide a plug-and-play system at the user side for enabling a user-centric mobile MANO management entity (u-MANO) interacting with the MANO entity of one or more network/service provider domains (p-MANOs), either fixed or mobile, building ad-hoc end-to-end network services (spanning from the end-user to the network side) in a dynamic and seamless manner (e.g. handling mobility, network resilience, and resource aggregation from multiple providers).

To provide such a plug-and-play system, embodiments may include interfaces between the u-MANO and the p-MANO(s). These interfaces can include information model/data models and operations to: (1) exchange relevant information—such as requirements, capabilities of the p-MANO (as well as the u-MANO), etc.; (2) collaborate on processing decisions of stitching constituent sNS segments deployed by the u-MANO and the p-MANO(s); and (3) coordinate among constituent sNSs—e.g., for FCAPS (Fault, Configuration, Accounting, Performance and Security) management, load balancing or aggregation, as well as to ensure the LCM of composite end-to-end (e2e) NS.

Embodiment can further include methods and entities (e.g. repository and discovery engine) for user discovery (self or network-assisted) of provider network and p-MANO availability and capabilities.

Embodiments can also include methods and entities for both intra-admin-domain and inter-admin-domain mobility Embodiments also provide methods for enabling collaborative orchestration between the u-MANO and the p-MANO. Such as an embodiment where the p-MANO and/or the u-MANO controls and coordinates the orchestration decisions among multiple p-MANOs and/or u-MANOs.

In an embodiment, a user entity has an mNFVI-PoP and a u-MANO system with the entities described above. For example, the mobile-BS 110 can provide the mNFVI-PoP environment and includes a u-MANO 112, 400, that has a provider MANO repository 420, a discovery engine 470, a monitoring engine 460, a mobility engine 460, an NFVO 412, a VNFM 414, a VIM/WIM 416, a resource topology repository 430, and an interface and connectivity manager 440.

In an embodiment, a user entity performs handover as per existing mobility management techniques (whether network assisted or mobile node assisted) (e.g., using ETSI standard techniques). The user may have one or multiple network interfaces (for example characterized by SIM cards) to be able to get connected to one or multiple mobile network service providers.

In an embodiment, an u-MANO and a p-MANO collaborate over well-defined interfaces to create end-to-end Network Service.

In an embodiment, a u-MANO discovers available p-MANO systems with respect to its existing location. The p-MANO is able to provide relevant information to the u-MANO to indicate what service(s) and/or resources it can provide. The discovered p-MANO(s) may or may not be included in the P-MANO repository.

In an embodiment, the discovery process executed by a u-MANO to discover p-MANO(s) includes the following: Based on identities and address(es) of p-MANO instance(s) that are maintained inside a u-MANO's provider repository, the u-MANO sends solicitation messages to discover the reachability and availability of the p-MANO instance(s). If present, then the u-MANO sends service request specifying resource, performance, and reliability requirements (at the minimum). Upon acceptance of the service request, the u-MANO and p-MANO will trigger the process to instantiate the end-to-end NS. In case the solicited p-MANO(s) are not reachable or not able to fulfil the required service requirements, then the u-MANO will send out a general solicitation message (e.g. via broadcasting) to discover p-MANO instance(s) that are reachable and available and the u-MANO will negotiate SLA before proceeding to instantiate an end-to-end NS.

In an embodiment, both u-MANO and p-MANO systems support mobility (including the detection of user location, and handover decision procedure). The u-MANO may select the p-MANO instance(s), or a provider network assigns a suitable p-MANO to the u-MANO depending on the location of the user entity and/or service availability/quality and/or user preferences. The user entity can overrule the decisions of the provider recommended p-MANO(s).

According to an embodiment, the process for managing end-to-end NS continuity in the event of the u-MANO mobility includes the following: A u-MANO before and/or after undergoing handover to a new point of connection will inform a corresponding p-MANO instance(s) of its new location Id and IP address. This will make any routing/configuration updates on the existing NS instance(s) managed between the u-MANO and/or the p-MANO. The u-MANO may also trigger a request to the p-MANO provider domain to migrate and/or scale the existing sNS segments in the edge (or core) to different fNFVI-PoPs and/or bring them under the management of a different p-MANO instance in order to ensure against any performance degradation due to the mobility of u-MANO.

Figure 7:
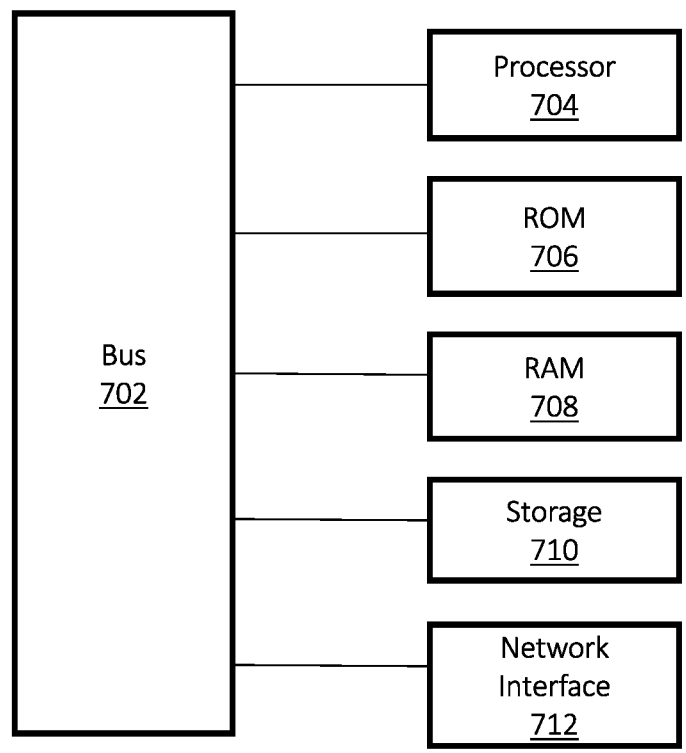
FIG. 7 illustrates a processing system according to an embodiment.

FIG. 7 is a block diagram of a processing system according to one embodiment. The processing can be used to implement the method described above. The processing system includes a processor 704, such as a central processing unit (CPU) of the computing device or a dedicated special-purpose infotainment processor, executes computer executable instructions comprising embodiments of the system for performing the functions and methods described above. In embodiments, the computer executable instructions are locally stored and accessed from a non-transitory computer readable medium, such as storage 710, which may be a hard drive or flash drive. Read Only Memory (ROM) 706 includes computer executable instructions for initializing the processor 704, while the random-access memory (RAM) 708 is the main memory for loading and processing instructions executed by the processor 704. The network interface 712 may connect to a wired network or cellular network and to a local area network or wide area network, such as the Internet While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A computer-based method for operating a manager and orchestrator (u-MANO) inside a user domain to ensure deployment and service integrity of end-to-end network services in collaboration with at least one provider manager and orchestrator (p-MANO), the method comprising:
  receiving a request for a network service instance;
  determining whether a scope of the request extends beyond the user domain;
  initiating a discovery operation to discover the at least one p-MANO in a case where the scope extends beyond the user domain, the discovery operation comprising:
    determining an identity and/or an address of the at least one p-MANO;

sending a solicitation message to the at least one p-MANO to discover a reachability and an availability of the at least one p-MANO;
sending a service request specifying network service requirements to the at least one p-MANO in response to receiving a solicitation response from the at least one p-MANO; and
receiving a service acceptance from the at least one p-MANO; and
instantiating and deploying the network service instance that is at least partially within the user domain and partially outside the user domain.

2. The computer-based method according to claim 1, wherein the u-MANO is implemented in a mobile entity.

3. The computer-based method according to claim 1, wherein the network service requirements comprise at least one of service function requirements, feature requirements, capability requirements, resource requirements, performance requirements, quality of service requirements, or reliability requirements.

4. The computer-based method according to claim 1, wherein the service request specifies at least one of identification of a location of the u-MANO.

5. The computer-based method according to claim 1, wherein the discovery operation further comprises:
receiving a plurality of solicitation responses, including the solicitation response, from a plurality of p-MANOs, including the at least one p-MANO; and
inspecting the plurality of solicitation responses and determining a selected p-MANO based upon a result of the inspecting,
wherein the service request is sent to the selected p-MANO.

6. The computer-based method according to claim 1, wherein the discovery operation further comprises:
based upon determining one or more of the reachability as unreachable, the availability as unavailable, or the network service requirements are unfulfillable by the at least one p-MANO, sending a general solicitation message to discover a new p-MANO that is reachable and available; and
based upon discovering the new p-MANO, negotiating access to the new p-MANO, and
wherein the instantiating and deploying the network service instance comprises collaborating with the new p-MANO.

7. The computer-based method according to claim 1, further comprising:
monitoring the network service instance performance; and
upon determining the network service instance performance is outside performance requirements, executing a handover operation to handover at least one network service segment to a new p-MANO.

8. The computer-based method according to claim 7, wherein the handover operation comprises initiating the discovery operation to discover the new p-MANO.

9. The computer-based method according to claim 7, further comprising, in the case that the network service instance performance is outside the performance requirements due to mobility of the u-MANO, informing the new p-MANO and/or the at least one p-MANO at least one of a new location information or an IP address to enable routing and/or configuration updates on the network service instance.

10. The computer-based method according to claim 1, wherein the network service instance that is at least partially within the user domain and partially outside the user domain comprises a sub-network service instance that is in the user domain and a second sub-network service instance that is in the domain of the p-MANO, and wherein the sub-network service in the user domain uses network function virtualization infrastructure within the user domain.

11. The computer-based method according to claim 1,
wherein sending the service request and receiving the solicitation response comprises exchanging information relevant to instantiating and deploying the network service instance,
wherein the network service instance comprises a plurality of sub-network service (sNS) segments stitched together, at least one of the sNS segments being within the user domain and at least one of the sNS segments being outside the user domain, and
wherein the method further comprises:
collaborating with the p-MANO on processing decisions concerning stitching together sub-network service segments to create the network service instance; and
coordinating among the sNSs segments to perform at least one of fault, configuration, accounting, performance and security (FCAPS) management, load balancing, aggregation, or ensuring lifecycle management of the network service instance.

12. A mobile processing system for deploying a manager and orchestrator (u-MANO) inside a user domain, the mobile processing system comprising at least one processor coupled to a non-transitory processor-readable storage medium having processor executable instructions that, when executed by the processor, deploy the u-MANO that comprises:
an MANO system for controlling networking and computing resources and for instantiating and deploying a network service;
an interface for communicating outside the user domain;
a provider repository containing a list of provider details, including at least one of user contact information, subscription information, catalogues of resources, catalogs of service types, and capabilities associated with least one provider MANO (p-MANO); and
a discovery engine configured to initiate a discovery operation to discover the at least one p-MANO in a case where a scope of the network service being deployed by the mobile processing system extends beyond the user domain, the discovery operation comprising:
interacting with the provider repository to determine an identity and/or an address of the at least one p-MANO;
sending, via the interface, a solicitation message to the at least one p-MANO to discover a reachability and an availability of the at least one p-MANO;
sending, via the interface, a service request specifying network service requirements to the at least one p-MANO in response to receiving, via the interface, a solicitation response from the at least one p-MANO; and
receiving, via the interface, a service acceptance from the at least one p-MANO.

13. The mobile processing system according to claim 12, wherein the u-MANO further comprises:
a monitoring engine configured to receive, via the interface, network and service monitoring reports for the at least one p-MANO; and
an interface and connectivity manager configured to configure and manage the interface and monitor connections with the at least one p-MANO, wherein the discovery engine is further configured to perform the following operations:
interface with at least one of the monitoring engine or the interface and connectivity manager to determine whether a service error exists, the service error being based on determining at least one of the following is associated with the at least one p-MANO: the reachability is unreachable, the availability is unavailable, or the network service requirements are unfulfillable;
based upon determining the service error exists, send a general solicitation message, via the interface, to discover a new p-MANO that is reachable and available; and
based upon discovering the new p-MANO, negotiate access to the new p-MANO, and
wherein the u-MANO system is configured to instantiate and deploy the network service instance in collaboration with the new p-MANO.

14. The mobile processing system according to claim 13, wherein the u-MANO further comprises a mobility engine configured to:
interface with the monitoring engine and/or the connectivity manager to determine the network service performance; and
upon determining the network service performance is outside performance requirements, execute a handover operation to handover at least one network service segment to a new p-MANO.

15. The mobile processing system according to claim 14, wherein the handover operation comprises initiating the discovery operation to discover the new p-MANO.

16. The mobile processing system according to claim 13, wherein the mobility engine is configured to inform the new p-MANO and/or the at least one p-MANO of at least one of a new location information or an IP address to enable routing and/or configuration updates based upon the network service instance performance being outside the performance requirements due to mobility of the u-MANO.

17. A provider processing system for deploying a manager and orchestrator (p-MANO) outside a user domain, the provider processing system comprising at least one processor coupled to a non-transitory processor-readable storage medium having processor executable instructions that, when executed by the processor, deploy the p-MANO that comprises:
a network functions virtualization orchestrator (NFVO), the NFVO configured to interact with a plurality of data repositories via reference points, the plurality of data repositories including a u-MANO repository that includes at least one of identity information, location information, a security certificate, an SLA condition, or configuration information for at least one MANO in the user domain (u-MANO) that is subscribed to the p-MANO;
a virtualized network functions manager (VNFM); and
a virtualized infrastructure manager (VIM),
wherein the p-MANO is configured to coordinate with the at least one u-MANO to instantiate and deploy a network service at least partially inside the user domain.

* * * * *